United States Patent
Oehring et al.

(10) Patent No.: US 6,237,675 B1
(45) Date of Patent: May 29, 2001

(54) AUTOMATIC TEMPERATURE CONTROLLED SEATS

(75) Inventors: Chris George Oehring, Monroe; Gerhard Allan Dage, Franklin; Hilton W. Girard, Roseville; John David Hoeschele, Detroit; Lee Davidson Foster, Belleville, all of MI (US)

(73) Assignee: Ford Global Technolgies, Inc., Dearborn, MI (US)

( * ) Notice: Subject to any disclaimer, the term of this patent is extended or adjusted under 35 U.S.C. 154(b) by 0 days.

(21) Appl. No.: 09/332,849

(22) Filed: Jun. 14, 1999

(51) Int. Cl.[7] .................................................. G05D 23/00
(52) U.S. Cl. ........................... 165/41; 165/288; 165/291; 219/202
(58) Field of Search .............................. 165/41, 202, 297, 165/253, 254, 291, 42, 43, 288, 200, 203, 204, 287; 219/202; 454/75; 62/244

(56) References Cited

U.S. PATENT DOCUMENTS

| | | |
|---|---|---|
| 4,520,258 | 5/1985 | Grohmann . |
| 4,572,430 * | 2/1986 | Takagi et al. ..................... 219/202 X |
| 4,633,061 * | 12/1986 | Arikawa ................................ 219/202 |
| 4,881,456 * | 11/1989 | Yasuda et al. ......................... 454/75 |
| 4,926,025 * | 5/1990 | Wilhelm ................................ 219/202 |
| 4,978,061 * | 12/1990 | Ogihara et al. ..................... 454/75 X |
| 5,275,012 * | 1/1994 | Dage et al. ........................ 219/202 X |
| 5,288,974 * | 2/1994 | Hanzic ............................. 219/202 X |
| 5,330,385 * | 7/1994 | Hotta et al. ............................. 454/75 |
| 5,524,439 | 6/1996 | Gallup . |
| 5,579,994 | 12/1996 | Davis, Jr. . |
| 5,626,021 | 5/1997 | Karunasiri . |
| 5,860,593 * | 1/1999 | Heinle et al. ......................... 165/204 |
| 5,878,809 * | 3/1999 | Heinle ................................... 165/203 |
| 5,921,100 * | 7/1999 | Yoshinori et al. ............... 219/202 X |
| 6,079,435 * | 6/2000 | Esaki et al. ........................ 165/42 X |
| 6,124,577 * | 9/2000 | Fristedt ............................. 219/202 X |

FOREIGN PATENT DOCUMENTS 61-113511 * 5/1986 (JP) ........................................ 165/42

* cited by examiner

Primary Examiner—Marvin M. Lateef
Assistant Examiner—Ljiljana V. Ciric
(74) Attorney, Agent, or Firm—Raymond L. Coppiellie

(57) ABSTRACT

A method for automatically controlling the temperature of a vehicle seat (14) based on a variety of factors, including vehicle interior temperature, outside temperature, sunload, and user set point. Each of these readings is sent to a controller (30) where they are weighted by a formula to arrive at a target temperature. Based on that target temperature, a seat level is calculated and then transmitted to a heated seat controller (48) to apply the appropriate temperature to the vehicle seats (14).

13 Claims, 2 Drawing Sheets

AUTOMATIC TEMPERATURE CONTROLLED SEATS

TECHNICAL FIELD

The present invention relates generally to methods and control systems for temperature controlled vehicle seats. More particularly, the present invention relates to methods and control systems for automatically controlling the temperature of vehicle seats.

BACKGROUND ART

A fundamental goal of automotive heating and cooling systems is to make vehicle occupants comfortable. The effectiveness of heating and cooling systems is largely dependent on the ability of the temperature conditioned air to contact and surround all portions of the occupant's body. However, in applications such as vehicles and the like, the occupants are typically fixed in one position with a large portion of the body's surface against the surface of a seat. In such applications, the distribution of temperature conditioned air into the cabin of the vehicle to heat or cool the occupant is less effective due to the somewhat limited surface area of contact with the occupant's body.

To address this problem, many current vehicles utilize temperature controlled seats in order to properly heat or cool an occupant's body. The current heated seats, however, suffer from a variety of disadvantages. First, these heated seats are manually actuated by a driver or passenger and have a limited number of settings. The typical number of settings available with current heated seats is 1 to 5. While these systems will control the temperature of the seat based on the setting selected, these seats have a difficult time maintaining a desired temperature. Consequently, the temperature of these current heated seats is constantly being adjusted in order to provide a constant and comfortable temperature.

SUMMARY OF THE INVENTION

It is therefore an object of the present invention to provide a method and control system for automatically controlling the temperature of heated vehicle seats that eliminates the need to turn the heat source on and off as well as to continually adjust the temperature setting.

It-is another object of the present invention to provide a method and control system for automatically controlling the temperature to which a vehicle seat is heated or cooled based on a variety of climate conditions.

In accordance with the objects of the present invention, a method for automatically controlling the temperature of a vehicle seat is provided. The system includes a plurality of sensors that are in communication with a controller. A first sensor determines the amount of sunload that is being applied to the vehicle. A second sensor determines the air temperature outside of the vehicle or the outside temperature. A third sensor determines the vehicle interior temperature. The controller is also in communication with a set controller that indicates the seat temperature that a user desires. These factors are fed into the controller and then weighted appropriately. Based on these values, the amount of heat or cold to be applied to the seat is calculated in the controller and then automatically applied to the seat.

In accordance with another object, the amount of heat or cold to be applied to the seat is calculated and then automatically applied to the seat. The temperature of the seat is detected and fed back to the controller to ensure that the seat is heated or cooled to the proper temperature.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Many current vehicles that have heated seats also have an electronic automatic climate control (ETCC) system that controls the interior temperature of the vehicle to maintain comfort. An EATC system receives input from multiple sensors, including outside ambient temperature, vehicle interior temperature, and sunload and uses these inputs as well as the set point on the control to determine the amount of air (blower voltage) and the temperature of the air in order to maintain a comfortable interior temperature. Many EATC systems also utilize an engine coolant sensor and use that reading to assist in determining a comfortable interior temperature. In accordance with the present invention, some of the readings from these sensors are used to control the temperature of vehicle seats.

In general, it is known that control of air temperature and air flow within an automobile is accomplished using various actuators to affect the temperature and flow of air supplied to the cabin of the vehicle. Such an air handling system is shown and described in U.S. Pat. No. 5,516,041.

Figure 1:
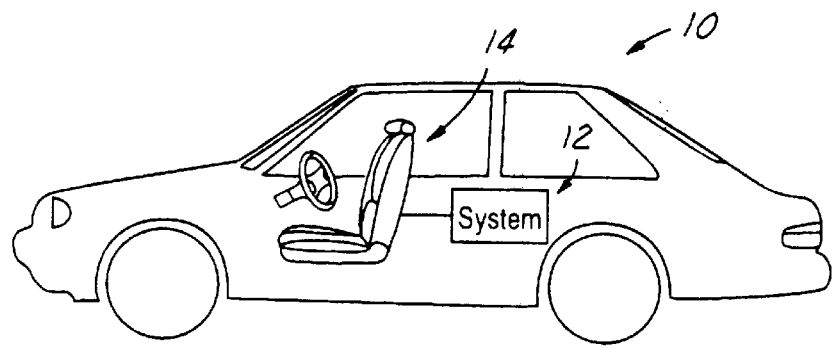
FIG. 1 is a schematic illustration of a system for automatically controlling the temperature of a vehicle seat in accordance with a preferred embodiment of the present invention.

FIG. 1 schematically illustrates an automobile 10 having a control system 12 for automatically controlling the amount of heat or cold that is applied to an automobile seat 14. The temperature of the driver's seat, the passenger's seat, or both may be controlled. However, if both are controlled, they preferably are independently controlled and adjusted as desired. It should be understood that the system 12 of the present invention may be utilized with any automobile or other types of vehicles, including trucks, airplanes, ships, and the like.

Figure 2:
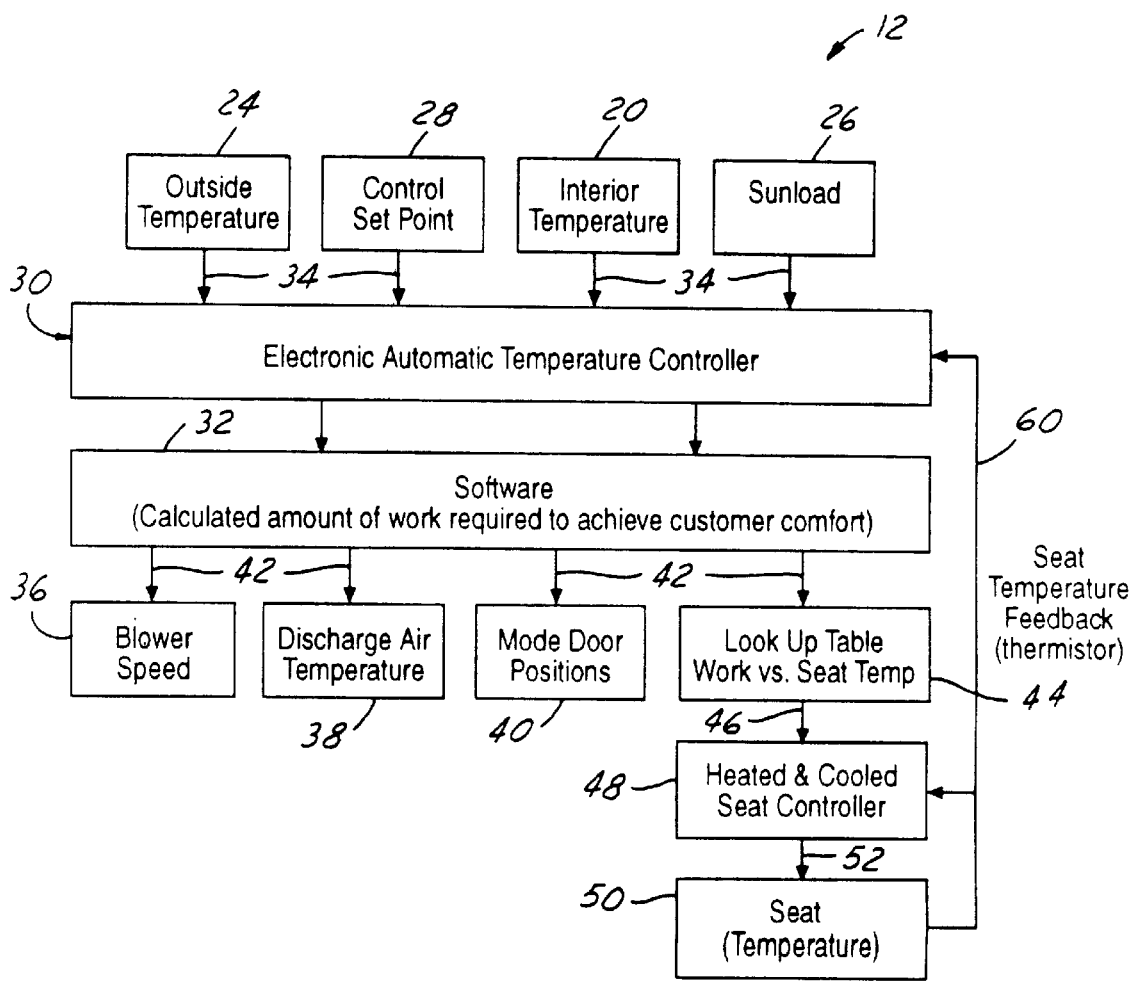
FIG. 2 is a schematic block diagram of a control system in accordance with a preferred embodiment of the present invention.

FIG. 2 schematically illustrates a preferred embodiment of the control system 12 for controlling the temperature to be applied to the vehicle seat 14. The system 12 includes an interior temperature sensor 20, an outside air temperature sensor 24, and a sunload sensor 26. In addition, there is a control set point or set temperature volume sensor 28, that is manually set by the user to indicate the user's desired seat temperature.

Each of the sensors 20, 24, 26, 28 generate input signals 34 that are provided to an electronic automatic temperature controller 30. The controller 30 contains software therein, generally represented by reference number 32, that calculates the amount of work required to heat or cool the seat to a temperature that provides maximum customer comfort. As discussed in more detail below, the software 32 in the controller 30 scales the input signals 34 to control the speed of the blower as generally represented by reference number 36, the discharge air temperature, as generally represented by reference number 38, and the positions of the doors as generally represented by reference number 40 via respective output signals 42.

Based on the inputs form the outside or ambient temperature sensor 24, the vehicle interior sensor 20, the sunload sensor 26, and the user control set point 28, the seat temperature is turned on and off or continually adjusted in accordance with the following equation:

target temp=offset−$K_1$*(sunload)+$K_2$*(set point−75)+$K_3$*(75−ambient temperature)+$K_4$*(set point−interior temperature).

The sunload, set point, ambient temperature, and interior temperature are all measured from the respective sensors 20, 24, 26, 28. The offset and the coefficients $K_1$–$K_4$ vary depending upon the vehicle, the system being used, and other factors, which may be easily determined through experimentation by one of ordinary skill in the art. However, by way of example, in one specific application the offset was equal to 124 and the coefficients were assigned values as follows:

$K_1$=0.500

$K_2$=3.5

$K_3$=1.2

$K_4$=4.4

Based on these coefficients and the readings from the respective sensors, 20, 24, 26, 28, the target temperature is determined. Once the target temperature is determined, the controller 30 consults a look up table, generally represented by reference number 44.

Figure 3:
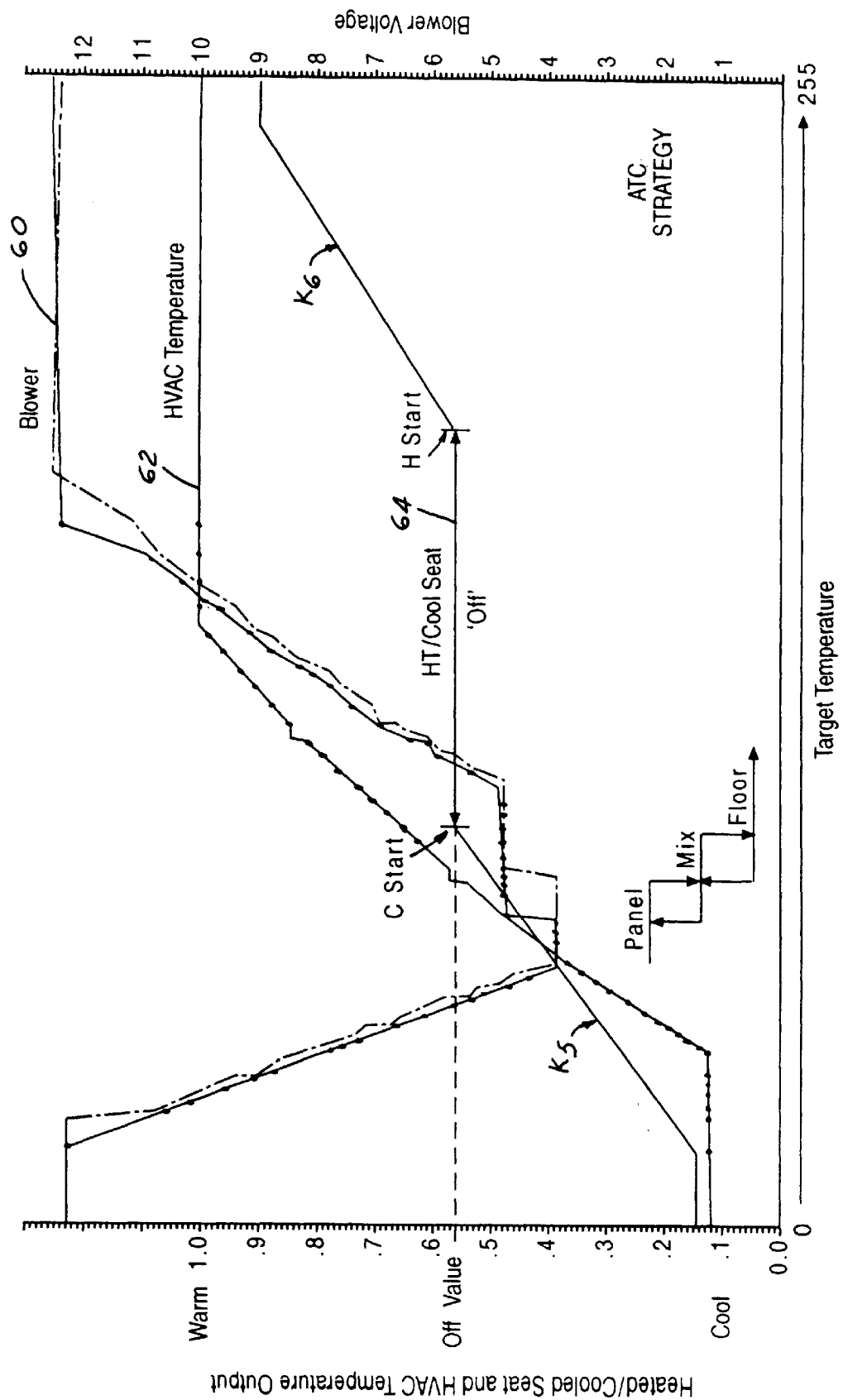
FIG. 3 is an exemplary look-up table in accordance with a preferred embodiment of the present invention.

FIG. 3 illustrates an exemplary look up table for determining seat temperature output based on the calculated target temperature. The look up table generally charts heat/cooled seat and HVAC temperature output on one axis ("y-axis") and target temperature on the other axis ("x-axis"). On the x-axis axis, the target temperature ranges from between 0 and approximately 255 and on the y-axis, the seat temperature output represents the various seat settings such as "off", "warm", or "cool". Obviously, other intermediate settings may be utilized. Alternatively, settings may be eliminated and replaced by continuous variable adjustment.

As shown in FIG. 3, the blower voltage is positioned along the right hand side of the graph and the heated/cooled seat and HVAC temperature output is charted on the y-axis. As shown on the y-axis the temperature output ranges from cool to off and from off to warm with various temperature settings positioned therebetween. The three variables plotted are the blower voltage 60, the HVAC temperature 62 and the seat temperature 64. Thus, depending upon the target temperature as calculated by the above equation, the appropriate power level is determined from the table.

For example, by way of illustration, and as determined by another look up table, if the value of the seat heat (target temperature) is at 235 or above, seat heat power level 2 would be activated. If the value of the seat heat (target temperature) is between 215 and 234, then seat heat power level 1 would be activated. If the value of the seat heat (target temperature) is at 195 or below, the seat heat power level will be in an off position. It should be understood that these values are merely for illustration purposes and will vary depending upon the vehicle and the system. Further, the number of seat heat levels is also a matter of design choice and could be either stepped or variable.

Once the appropriate seat temperature output has been determined from the look up table, as generally represented by reference number 44, the temperature output is communicated via an output signal 46 to a heated and cooled seat controller 48. The seat controller 48 may be the existing heated seat modules or it may be modified to perform additional functions as provided herein below. Based on the signal 46 which is applied to the heated and cooled seat controller 48, the appropriate heat temperature will be applied to the seats, as generally represented at 50, by signal 52.

Through this system, the seat temperature is continuously adjusted based on the values received from the sensors 20, 24, 26, 28. In operation, the seat would warm up to a comfortable temperature when the vehicle interior is cold and gradually reduce the seat temperature as the interior of the vehicle warms up when not as much seat heat is required to keep the customer comfortable. This control of the seat temperature in this fashion is performed in an open loop fashion. The reverse happens if the vehicle interior is hot such that the seat is cooled to a comfortable temperature.

In accordance with the present invention, the temperature of the seats, as generally represented by reference number 50, may alternatively be controlled in a closed loop feedback. As with the open loop embodiment, the temperature output that is applied to the seat is automatically controlled based on the readings from the sensors 20, 24, 26, 28 which are fed into the controller 30 and processed by the software 32, as discussed above. Based on the value of target temperature, the temperature output to be applied to the seat is determined from the look up table 44 and applied to the heated and cooled seat controller 48. The seat controller 48 then adjusts the temperature of the seats, as generally indicated by reference number 50.

A seat temperature feedback system 60 is preferably provided. The feedback system provides communication between the heated seats 50 and the seat controller 48 and the electronic automatic temperature controller 48 and the electronic automatic temperature controller 30. The seat temperature feedback system 60 preferably consists of a rheostat or other device in communication with the seat to measure its temperature and ensure that it is in agreement with the level instructed by the seat controller 48. The feedback system 60 provides a signal from the seats to the electronic automatic temperature controller 30 where the signal, which represents the actual temperature of the seat, is subjected to an additional evaluation to determine if the seat temperature needs to be adjusted.

First, the target temperature to which the vehicle seat is to be set is determined in accordance with the equation set forth above, namely, Target temperature=offset−K*(sensed sunload)+$K_2$*(determined set point−75)+$K_3$*(75−sensed ambient temperature)+$K_4$*(set point−sensed interior temperature).

Based on the calculated target temperature, a target seat temperature is determined from a look-up table. The target seat temperature is then in communication with the seat controller 48 to set the seat temperature to the appropriate value. The actual seat temperature is then monitored by the feedback system 60 to ensure that the actual seat temperature corresponds to the target seat temperature.

For Seat heating:

Seat Heating Output Level=OFF when [HRT] seat temp≧Target Seat Temp.

Otherwise,

Seat Heating Output Level=$K_6$*(Target Seat Temp−Seat Temp).

Where $K_6$ is the slope of the line shown in FIG. 3. As the seat temperature increases to that of the target seat temperature, the output of the seat controller 48 decreases until it is zero.

For Seat Cooling:

Seat Cooling Output Level=OFF when [HRT] Seat Temp$\geq$Target Seat Temp

Otherwise,

Seat Cooling Output Level=$K_5$*(Seat Temp −Target Seat Temp).

Where $K_5$ is the slope of the line shown in FIG. 3. As the seat temperature decreases to that of the target seat temperature, the output of the seat controller 48 decreases until it is zero. While the look-up table has been shown and described as operating in a linear control mode, it should be understood that it can also be applied in a nonlinear mode.

While particular embodiments of the invention have been shown and described, numerous variations and alternate embodiments will occur to those skilled in the art. Accordingly, it is intended that the invention be limited only in terms of the appended claims.

What is claimed is:

1. Move the limitations "assigning a weighted value to each of said sensed ambient temperature, said sensed interior temperature, said sensed amount of sunload, and said determined set point temperature;" to a location immediately following the limitations "communicating said sensed ambient temperature, said sensed interior temperature, said sensed sunload, and said determined set point temperature to an electronic controller;".

2. The method as recited in claim 1, further comprising a seat controller for applying an temperature setting to the vehicle seat depending upon said calculated target temperature.

3. The method as recited in claim 2, wherein based on said calculated target temperature, a seat temperature level for heating or cooling the vehicle seat is determined, said seat temperature level is then transmitted to said seat controller.

4. The method as recited in claim 1, wherein said calculated target temperature is determined based on the following equation:

target temperature=offset+$K_1$* (sensed sunload)+$K_2$*(determined set point−75)+$K_3$*(75−sensed ambient temperature)+$K_4$*(set point−sensed interior temperature)

wherein $K_1$, $K_2$, $K_3$, and $K_4$ are weighted coefficients having different values.

5. The method as recited in claim 4, wherein $K_4$ is larger than $K_2$ and $K_2$ is larger than $K_3$ and $K_3$ is larger than $K_1$.

6. The method as recited in claim 5, wherein if said electronic controller determines that said actual seat temperature is not equal to said target seat temperature than a signal is applied to said seat to adjust the temperature of the vehicle seat.

7. The method as recited in claim 1, further comprising:

transmitting an actual temperature of the vehicle seat to said electronic controller to determine if said actual seat temperature is equal to said target seat temperature.

8. Move the limitations "assigning a different weighted value to each of said measured ambient temperature, said measured vehicle interior temperature, said measured vehicle sunload, and said sensed user temperature set point at an electronic temperature controller;" to a location immediately following the limitations "receiving said measured ambient temperature, said measured vehicle interior temperature, said measured vehicle sunload, and said sensed user temperature set point at said electronic controller;".

9. The method as recited in claim 8, further comprising:

a seat controller for receiving information about said target temperature and applying said current to the vehicle seat.

10. The method as recited in claim 9, wherein based on said target temperature a seat temperature level to which the vehicle seat is to be heated or cooled is determined and transmitted to said seat controller.

11. The method as recited in claim 9, wherein said seat controller measures an actual temperature of the vehicle seat and transmits it to said electronic temperature controller.

12. The method as recited in claim 11, wherein said electronic temperature controller compares said actual seat temperature with said target seat temperature.

13. The method as recited in claim 12, wherein said electronic temperature controller sends a signal to said seat controller if said actual seat temperature is not equal to said target seat temperature to adjust the temperature of the vehicle seat.

* * * * *

UNITED STATES PATENT AND TRADEMARK OFFICE
CERTIFICATE OF CORRECTION

PATENT NO. : 6,237,675 B1
DATED : May 29, 2001
INVENTOR(S) : Chris George Oehring et al.

It is certified that error appears in the above-identified patent and that said Letters Patent is hereby corrected as shown below:

Column 5,
Delete lines 23-30, insert:
-- 1. A method for automatically controlling the temperature of a vehicle seat in a vehicle comprising the steps of:
sensing an ambient temperature outside the vehicle;
sensing an interior temperature within said vehicle;
sensing an amount of sunload acting on said vehicle;
determining a set point temperature for the vehicle seat as input by a user;
communicating said sensed ambient temperature, said sensed interior temperature, said sensed sunload, and said determined set point temperature to an electronic controller;
assigning a weighted value to each of said sensed ambient temperature, said sensed interior temperature, said sensed amount of sunload, and said determined set point temperature;
calculating a target temperature for the vehicle seat based on said sensed ambient temperature, said sensed interior temperature, said sensed sunload, and said determined set point temperature as well as on the corresponding weighted value for each; and
setting the seat temperature of the vehicle automatically based on said calculated target temperature. --
Delete lines 31-34, insert:
-- 2. The method as recited in claim 1, further comprising providing a seat controller for applying a temperature setting to the vehicle seat depending upon said calculated target temperature. --
Delete lines 35-41, insert:
-- 3. The method as recited in claim 2, wherein based on said calculated target temperature, a seat temperature level for heating or cooling the vehicle seat is determined, and said seat temperature level is then transmitted to said seat controller. --

UNITED STATES PATENT AND TRADEMARK OFFICE
CERTIFICATE OF CORRECTION

| | |
|---|---|
| PATENT NO. | : 6,237,675 B1 |
| DATED | : May 29, 2001 |
| INVENTOR(S) | : Chris George Oehring et al. |

It is certified that error appears in the above-identified patent and that said Letters Patent is hereby corrected as shown below:

Column 6,
Delete lines 15-23, insert:
-- 8. A method for automatically heating and cooling a vehicle seat, comprising:
measuring an ambient temperature;
measuring a vehicle interior temperature;
measuring a vehicle sunload;
sensing a user temperature set point;
receiving said measured ambient temperature, said measured vehicle interior temperature, said measured vehicle sunload, and said sensed user temperature set point at said electronic temperature controller;
assigning a different weighted value to each of said measured ambient temperature, said measured vehicle interior temperature, said measured vehicle sunload, and said sensed user temperature set point at an electronic temperature controller; determining a target temperature for the vehicle seat based on said received values for ambient temperature, vehicle interior temperature, vehicle sunload, and said sensed user temperature set point and their respective weighted values; and
applying a current to the vehicle seat to set the vehicle seat at said target temperature. --

Signed and Sealed this

Twenty-ninth Day of June, 2004

JON W. DUDAS
*Acting Director of the United States Patent and Trademark Office*